United States Patent
Wang et al.

(10) Patent No.: US 8,327,538 B2
(45) Date of Patent: Dec. 11, 2012

(54) METHODS TO FACILITATE EXTENDING GAS TURBINE ENGINE USEFUL LIFE

(75) Inventors: Yu Wang, Mason, OH (US); Michael Pitman, Cincinnati, OH (US); Wen Lu, Mason, OH (US); Jamison Janawitz, Loveland, OH (US)

(73) Assignee: General Electric Company, Schenectady, NY (US)

( * ) Notice: Subject to any disclaimer, the term of this patent is extended or adjusted under 35 U.S.C. 154(b) by 1408 days.

(21) Appl. No.: 11/251,679

(22) Filed: Oct. 17, 2005

(65) Prior Publication Data

US 2007/0084049 A1 Apr. 19, 2007

(51) Int. Cl.
*B23P 6/00* (2006.01)
(52) U.S. Cl. .................. 29/889.1; 29/889.22; 29/402.08
(58) Field of Classification Search ................ 29/401.1, 29/402.01, 402.04, 402.09, 402.11, 402.18, 29/407.01, 407.1, 889.1, 889.21, 889.22, 29/402.08
See application file for complete search history.

(56) References Cited

U.S. PATENT DOCUMENTS

| | | | | |
|---|---|---|---|---|
| 3,098,357 A * | 7/1963 | Marsh | | 60/793 |
| 5,259,727 A * | 11/1993 | Quinn | | 415/190 |
| 5,392,513 A * | 2/1995 | Mazzola et al. | | 29/889.1 |
| 5,524,430 A * | 6/1996 | Mazeaud et al. | | 60/798 |
| 5,623,826 A * | 4/1997 | Ohtsuka et al. | | 60/737 |
| 6,101,814 A * | 8/2000 | Hoke et al. | | 60/752 |
| 6,132,168 A | 10/2000 | Kovaleski et al. | | |
| 6,345,441 B1 * | 2/2002 | Farmer et al. | | 29/889.1 |
| 6,354,071 B2 | 3/2002 | Tegel et al. | | |
| 6,415,610 B1 * | 7/2002 | Parker | | 60/798 |
| 6,449,952 B1 * | 9/2002 | Emilianowicz et al. | | 60/772 |
| 6,471,471 B1 | 10/2002 | Bouyer | | |
| 6,474,941 B2 | 11/2002 | Dingwell et al. | | |
| 6,568,079 B2 * | 5/2003 | Farmer et al. | | 29/890.01 |
| 6,742,341 B2 | 6/2004 | Ryan et al. | | |
| 6,779,268 B1 * | 8/2004 | Farmer | | 29/890.01 |
| 6,782,620 B2 * | 8/2004 | Caldwell et al. | | 29/890.01 |
| 6,976,351 B2 | 12/2005 | Catharine et al. | | |
| 7,094,022 B2 | 8/2006 | Bruce | | |
| 2003/0106215 A1 * | 6/2003 | Heyward et al. | | 29/889.1 |
| 2004/0107575 A1 * | 6/2004 | Emilianowicz | | 29/890.01 |
| 2004/0219290 A1 * | 11/2004 | Nagaraj et al. | | 427/140 |
| 2005/0034459 A1 * | 2/2005 | McMasters et al. | | 60/752 |

* cited by examiner

*Primary Examiner* — David Bryant
*Assistant Examiner* — Ryan J Walters
(74) *Attorney, Agent, or Firm* — General Electric Company; Matthew P. Hayden; David J. Clement

(57) ABSTRACT

A method facilitates extending the useful life of a turbine engine including a combustor and a turbine downstream from and in flow communication with the combustor. The method comprises identifying at least a portion of the combustor that is at least one of distressed, worn, deteriorated, satisfied predetermined threshold data, and beyond serviceable limits, identifying at least one enhancement kit for installation within the combustor, and removing at least two portions of the combustor including at least two of a combustor dome assembly, a swirler/cowl assembly, and the combustor inner and outer liners. The method also comprises installing the enhancement kit within the turbine engine such that a useful life of the turbine engine is facilitated to be increased.

18 Claims, 4 Drawing Sheets

METHODS TO FACILITATE EXTENDING GAS TURBINE ENGINE USEFUL LIFE

BACKGROUND OF THE INVENTION

This application relates generally to gas turbine engines and, more particularly, to methods to facilitate extending the useful life and/or the reliability of gas turbine engines.

Air pollution concerns worldwide have led to stricter emissions standards both domestically and internationally. These same standards have caused turbine engine manufacturers to design more efficient engines, as well as design improved retrofit components that enable engines to operate more efficiently, with improved emissions, and/or with extended useful life and reliability. Moreover, the generally high capital costs associated with the purchase and maintenance of turbine engines, such as revenue losses generated during engine outages, have caused the same engine manufacturers to attempt to design engines that are more reliable and that have extended useful life.

Known turbine engines include a compressor for compressing air which is mixed with a fuel and channeled to a combustor wherein the mixture is ignited within a combustion chamber for generating hot combustion gases. At least some known combustors include a dome assembly, a bolt banding, and liners to channel the combustion gases to a turbine. The turbine extracts energy from the combustion gases for powering the compressor, as well as producing useful work to propel an aircraft in flight or to power a load, such as an electrical generator. The liners are coupled to the dome assembly at an upstream end with the bolt banding, and extend downstream from the bolt banding to define the combustion chamber.

Generally, assets, such as turbine engines, are subject to failure by two types of causes. Wear, which is highly correlated to operating hours (engine flight hours) or cyclic operation, and thermal shock, which is highly correlated to start events (engine cycles). Specifically, during engine operation, the combustor and the turbine are exposed to high temperatures which may induce thermal stresses within the combustor and/or the turbine. Over time, continued operation with thermal stresses may cause portions of the combustor and/or turbine thermally fatigue, causing material erosion, weakening, oxidation, and/or cracking to develop within such components.

To detect failed components as a result of wear and/or thermal shock, generally a determination to assess the mode more probable to cause failure of the asset is made and the mission (hours per cycle or flight leg for an aircraft engine) is selected to balance the failure modes, increasing the utilization of the life built into the engine. Known engine manufacturers then select pre-determined intervals at which time the engines are removed and newer engines are installed, or portions of the engine are inspected to determine if specific components, such as the combustor liner, are distressed or beyond serviceable limits, thus warranting repair or replacement. However, replacing engines without inspection generally results in sacrificing at least a portion of the useful life of the engine, while the combination of the inspections of engine components at pre-determined intervals in combination with necessary repairs and/or replacement installations, may be a costly and time-consuming process that adversely impacts the operational availability of such engines.

BRIEF SUMMARY OF THE INVENTION

In one aspect, a method to facilitate extending the useful life of a turbine engine including a combustor and a turbine downstream from and in flow communication with the combustor is provided. The method comprises identifying at least a portion of the combustor that is at least one of distressed, worn, deteriorated, satisfies pre-determined threshold data, and beyond serviceable limits, identifying at least one enhancement kit for installation within the combustor, and removing at least two portions of the combustor including at least two of a combustor dome assembly, a swirler/cowl assembly, and the combustor inner and outer liners. The method also comprises installing the enhancement kit within the turbine engine such that a useful life of the turbine engine is facilitated to be increased.

In another aspect, a method to facilitate extending the useful life of a turbine engine is provided. The method comprises determining threshold data for selected components within at least one of a combustor within the turbine engine and a turbine within the turbine engine and downstream from the combustor, determining criteria for replacing the selected components, identifying selected components warranting service based on the pre-determined criteria, and removing at least a portion of the combustor and a portion of the turbine extending downstream from the combustor from the turbine engine. The method also comprises implementing an enhancement kit within the turbine engine such that a portion of the combustor and the turbine are at least one of modified and retrofit to facilitate extending a useful life of the turbine engine is facilitated to be increased.

DETAILED DESCRIPTION OF THE INVENTION

Figure 1:
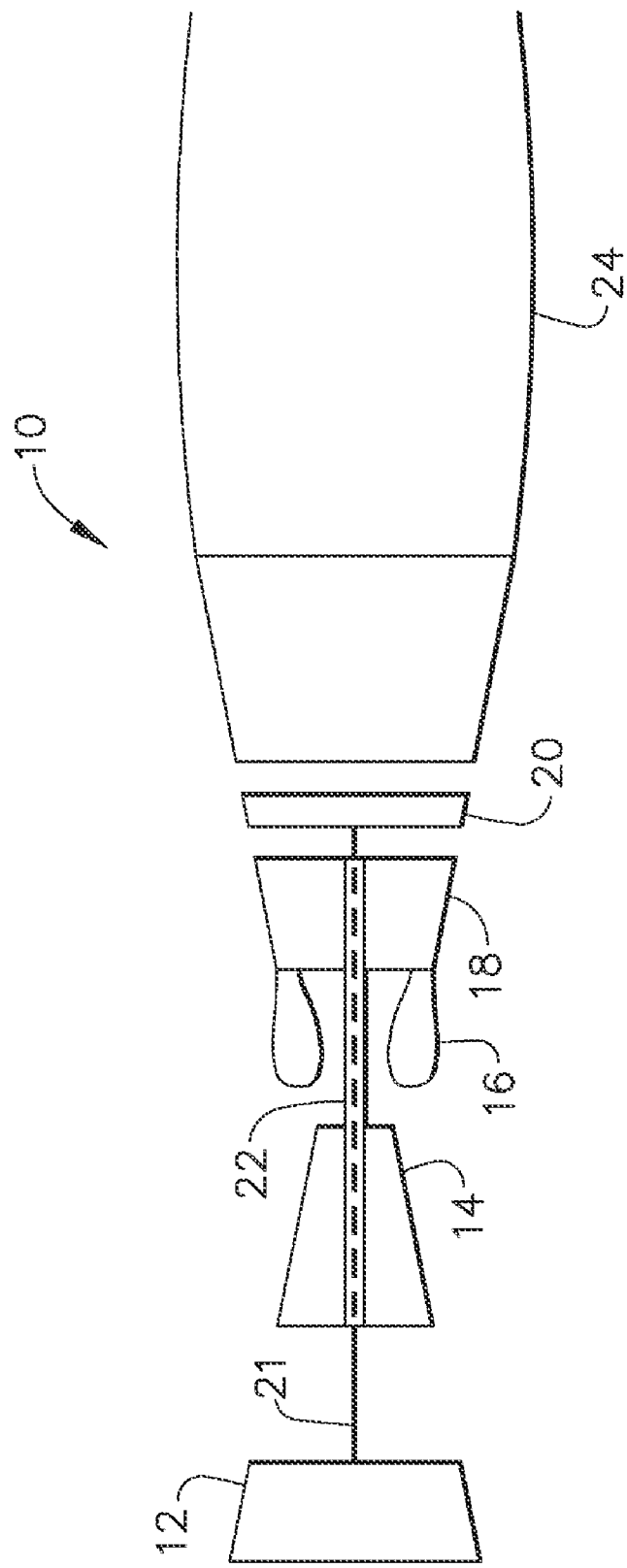
FIG. 1 is schematic illustration of an exemplary gas turbine engine including a combustor.

FIG. 1 is a schematic illustration of a gas turbine engine 10 including a low pressure compressor 12, a high pressure compressor 14, and a combustor 16. Engine 10 also includes a high pressure turbine 18 and a low pressure turbine 20. Compressor 12 and turbine 20 are coupled by a first shaft 22, and compressor 14 and turbine 18 are coupled by a second shaft 21. In one embodiment, gas turbine engine 10 is an LM2500 engine commercially available from General Electric Aircraft Engines, Cincinnati, Ohio. In another embodiment, gas turbine engine 10 is a CFM engine commercially available from General Electric Aircraft Engines, Cincinnati, Ohio.

In operation, air flows through low pressure compressor 12 supplying compressed air from low pressure compressor 12 to high pressure compressor 14. The highly compressed air is delivered to combustor 16. Airflow from combustor 16 is channeled through a turbine nozzle to drive turbines 18 and 20, prior to exiting gas turbine engine 10 through an exhaust nozzle 24.

Figure 2:
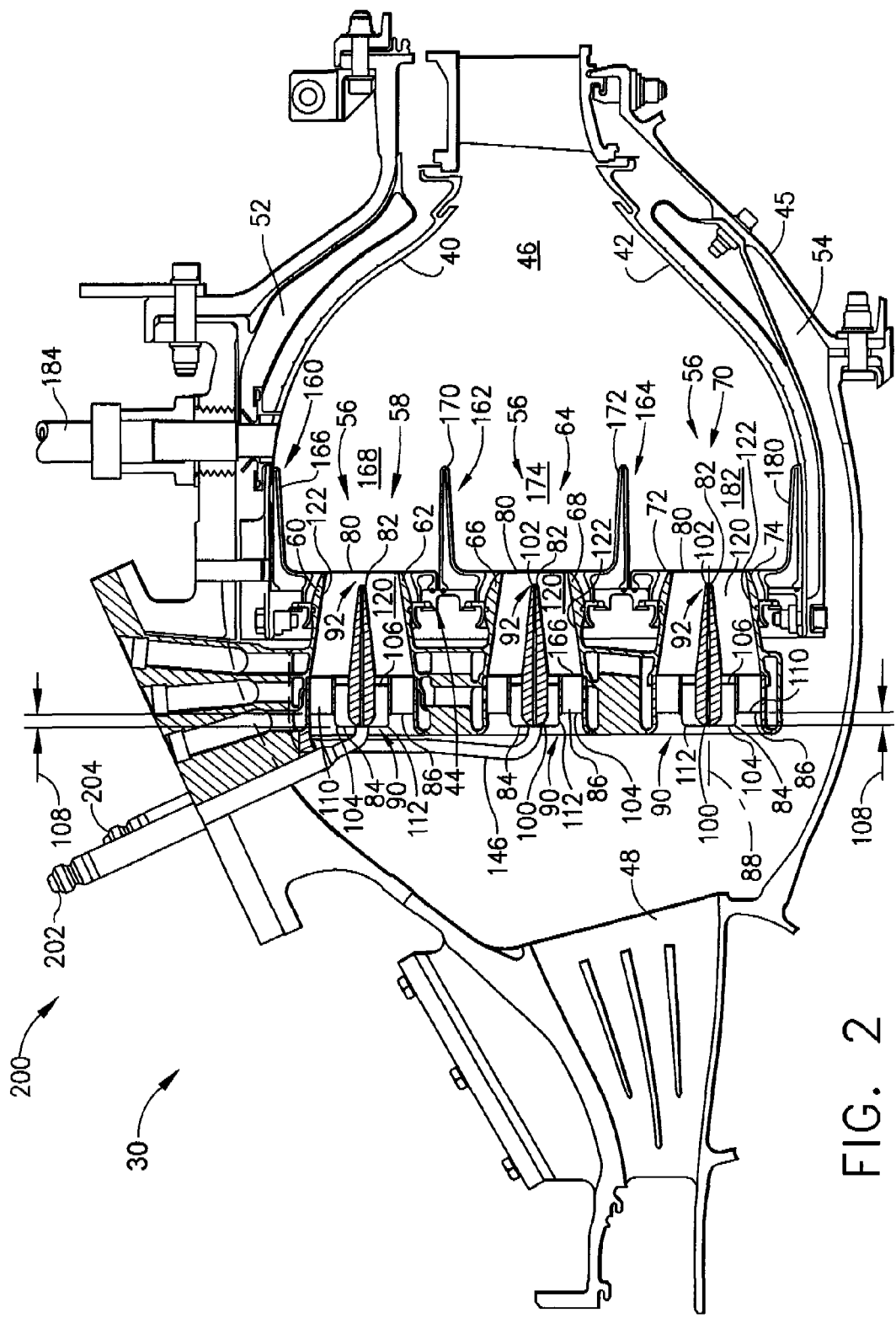
FIG. 2 is a cross-sectional view of an exemplary combustor that may be used with the gas turbine engine shown in FIG. 1.
Figure 3:
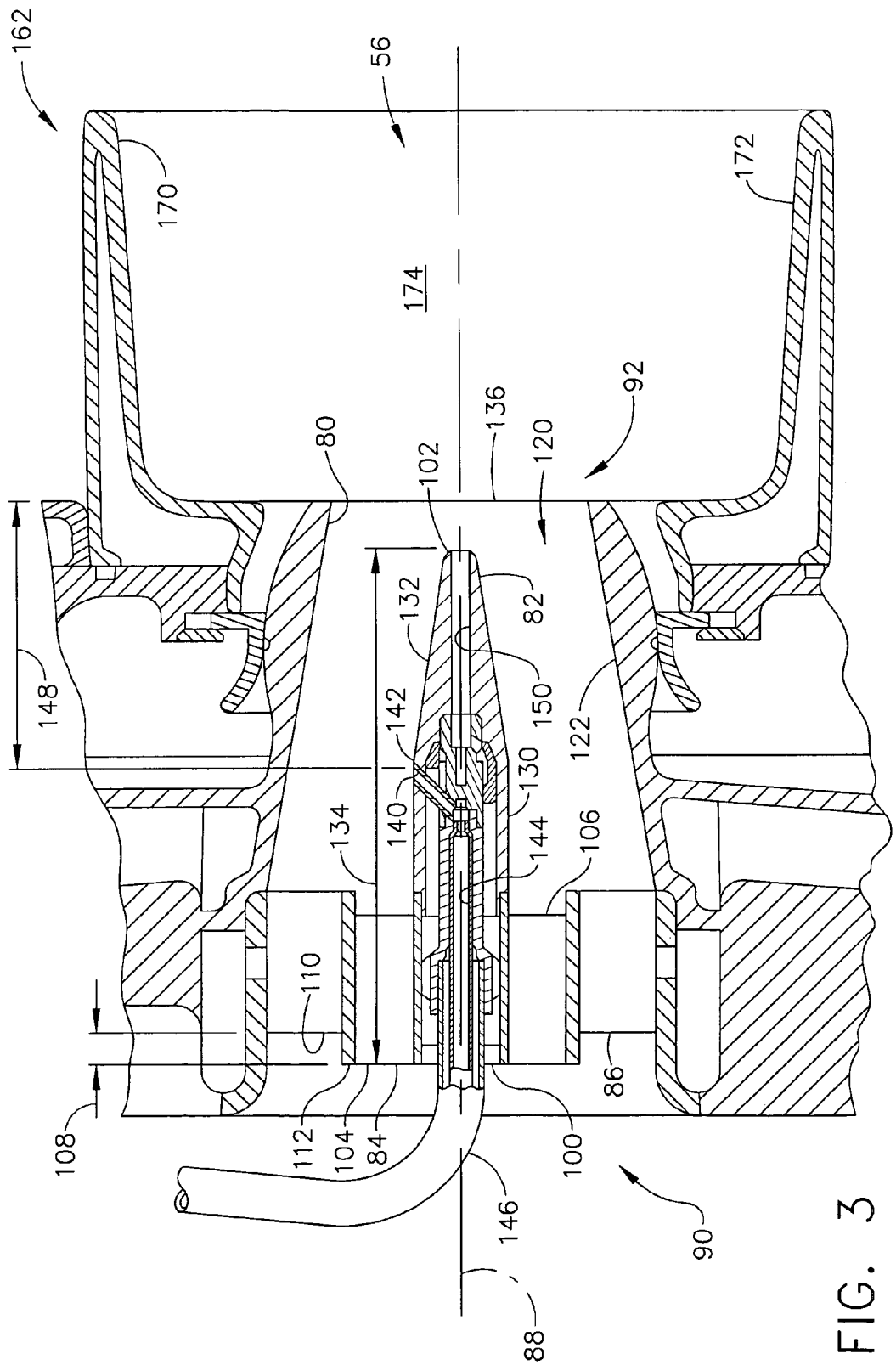
FIG. 3 is an enlarged partial cross-sectional view of the combustor shown in FIG. 2.

FIGS. 2 and 3 are a cross-sectional view and an enlarged partial cross-sectional view, respectively, of an exemplary combustor 30 that may be used in gas turbine engine 10 (shown in FIG. 1). Because a fuel/air mixture supplied to combustor 30 contains more air than is required to fully combust the fuel, and because the air is mixed with the fuel prior to combustion, combustor 30 is a lean premix combustor. Accordingly, a fuel/air mixture equivalence ratio for combustor 30 is less than one. Furthermore, because in the exemplary embodiment, gas and a liquid fuel are supplied to combustor 30, and because combustor 30 does not include water injection, combustor 30 is a dual fuel dry low emissions combustor.

Combustor 30 includes an annular outer liner 40; an annular inner liner 42, and a domed end 44 extending between outer and inner liners 40 and 42, respectively. Outer liner 40 and inner liner 42 are spaced radially inward from a combustor casing 45 and define a combustion chamber 46. Combustor casing 45 is generally annular and extends downstream from a diffuser 48. Combustion chamber 46 is generally annular in shape and is disposed radially inward from liners 40 and 42. Outer liner 40 and combustor casing 45 define an outer passageway 52 and inner liner 42 and combustor casing 45 define an inner passageway 54. Outer and inner liners 40 and 42 extend to a turbine nozzle 55 disposed downstream from diffuser 48.

Combustor domed end 44 includes a plurality of domes 56 arranged in a triple annular configuration. Alternatively, combustor domed end 44 includes a double annular configuration. In another embodiment, combustor domed end 44 includes a single annular configuration. An outer dome 58 includes an outer end 60 fixedly attached to combustor outer liner 40 and an inner end 62 fixedly attached to a middle dome 64. Middle dome 64 includes an outer end 66 attached to outer dome inner end 62 and an inner end 68 attached to an inner dome 70. Accordingly, middle dome 64 is between outer and inner domes 58 and 70, respectively. Inner dome 70 includes an outer end 72 attached to middle dome inner end 68 and an inner end 74 fixedly attached to combustor inner liner 42.

Each dome 56 includes a plurality of premixer cups 80 to permit uniform mixing of fuel and air therein and to channel the fuel/air mixture into combustion chamber 46. In one embodiment, premixer cups 80 are available from Parker Hannifin, 6035 Parkland Blvd., Cleveland, Ohio. Each premixer cup 80 includes a centerbody 82, an inner swirler 84, an outer swirler 86, and an axis of symmetry 88 extending from an upstream side 90 of dome 56 to a downstream side 92 of dome 56. In one embodiment, inner swirler 84 and outer swirler 86 are counter-rotating. Each centerbody 82 is disposed co-axially with dome axis of symmetry 88 and includes a leading edge 100 and a trailing edge 102. In one embodiment, centerbody 82 is cast within premixer cup 80.

Each inner swirler 84 is secured to a centerbody 82 radially outward from centerbody 82 and includes a leading edge 104 and a trailing edge 106. Each outer swirler 86 is secured to an inner swirler 84 radially outward from inner swirler 84. Outer swirler 86 is attached such that inner swirler leading edge 104 is a distance 108 upstream from a leading edge 110 of outer swirler 86. In one embodiment, distance 108 is approximately equal 0.25 inches. Furthermore, when outer swirler 86 is attached, centerbody 82 is positioned such that centerbody leading edge 100 is approximately co-planar with inner swirler leading edge 104 and distance 108 upstream from outer swirler leading edge 110.

A hub 112 separates each inner swirler 84 from each outer swirler 86 and an annular mixing duct 120 is downstream from inner and outer swirlers 84 and 86, respectively. Mixing duct 120 is annular and is defined by an annular wall 122. Annular mixing duct 120 tapers uniformly from dome upstream side 90 to dome downstream side 92 to increase flow velocities within mixing duct 120. Furthermore, because mixing duct 120 converges, a fuel/air mixture flowing within mixing duct 120 is accelerated which helps to minimize boundary layers from accumulating within mixing duct 120 and thus, minimizes flashbacks stemming therefrom.

Centerbody 82 also includes a cylindrically-shaped first body portion 130 and a conical second body portion 132. Second body portion 132 extends downstream from first body portion 130. Centerbody 82 has a length 134 extending from leading edge 100 to trailing edge 102. Length 134 is sized such that centerbody trailing edge 102 is disposed in close proximity to a trailing edge 136 of premixer cup 80.

Centerbody 82 is hollow and includes a first orifice 140 extending from an outer surface 142 of centerbody 82 to an inner passageway 144. First orifice 140 is disposed at a junction between centerbody first body portion 130 and centerbody second body portion 132. First orifice 140 is a fuel port used to supply fuel to premixer cup 80 and inner passageway 144. Orifice 140 is in flow communication with a fuel nozzle 146 positioned at centerbody leading edge 100. In one embodiment, fuel nozzles 146 are available from Parker Hannifin, 6035 Parkland Blvd., Cleveland, Ohio. A premixing length 148 is defined as a distance between first orifice 140 and dome downstream side 92.

A plurality of second passageways 150 extend through centerbody 82 and are in flow communication with an air source (not shown). Passageways 150 permit small amounts of air to be supplied to combustor 30 to permit wake separation adjacent centerbody 82.

Combustor domed end 44 also includes a outer dome heat shield 160, a middle dome heat shield 162, and an inner dome heat shield 164 to insulate each respective dome 58, 64, and 70 from flames burning in combustion chamber 46. Outer dome heat shield 160 includes an annular endbody 166 to insulate combustor outer liner 40 from flames burning in an outer primary combustion zone 168. Middle dome heat shield 162 includes annular heat shield centerbodies 170 and 172 to segregate middle dome 64 from outer and inner domes 58 and 70, respectively. Middle dome heat shield centerbodies 170 and 172 are disposed radially outward from a middle primary combustion zone 174.

Inner dome heat shield 164 includes an annular endbody 180 to insulate combustor inner liner 42 from flames burning in an inner primary combustion zone 182. An igniter 184 extends through combustor casing 45 and is disposed downstream from outer dome heat shield endbody 166.

Domes 58, 64, and 70 are supplied fuel and air via a premixer and assembly manifold system (not shown). A plurality of fuel tubes 200 extend between a fuel source (not shown) and domes 56. Specifically, an outer dome fuel tube 202 supplies fuel to premixer cup 80 disposed within outer dome 58, a middle dome fuel tube 204 supplies fuel to premixer cup 80 disposed within middle dome 64, and an inner dome fuel tube (not shown) supplies fuel to premixer cup 80 disposed within inner dome 70.

During operation of gas turbine engine 10, air and fuel are mixed in premixer cups 80 and as the atomized mixture is injected into combustion chamber 46 and ignited, heat is generated within chamber 46. Although air is directed into combustion chamber 46 to facilitate cooling of combustor 30 with a thin protective boundary of cooling air along liner surface 80, a variation in exposure of combustor liner surfaces to high temperatures may induce thermal stresses into liners 40. As a result of continued exposure to thermal stresses, over time, liners 40 may become deteriorated. Moreover, although heat shields 160, 162, and 164 facilitate insulating dome 58, 64, and 70 from flames burning in combustion chamber 46, over time, continued exposure to high temperatures may induce thermal stresses which may damage and/or dimensionally distort portions of combustor 30 and/or high pressure turbine 18 (shown in FIG. 1) to thermally fatigue, causing material erosion, weakening, oxidation, and/or cracking to develop within such components.

Figure 4:
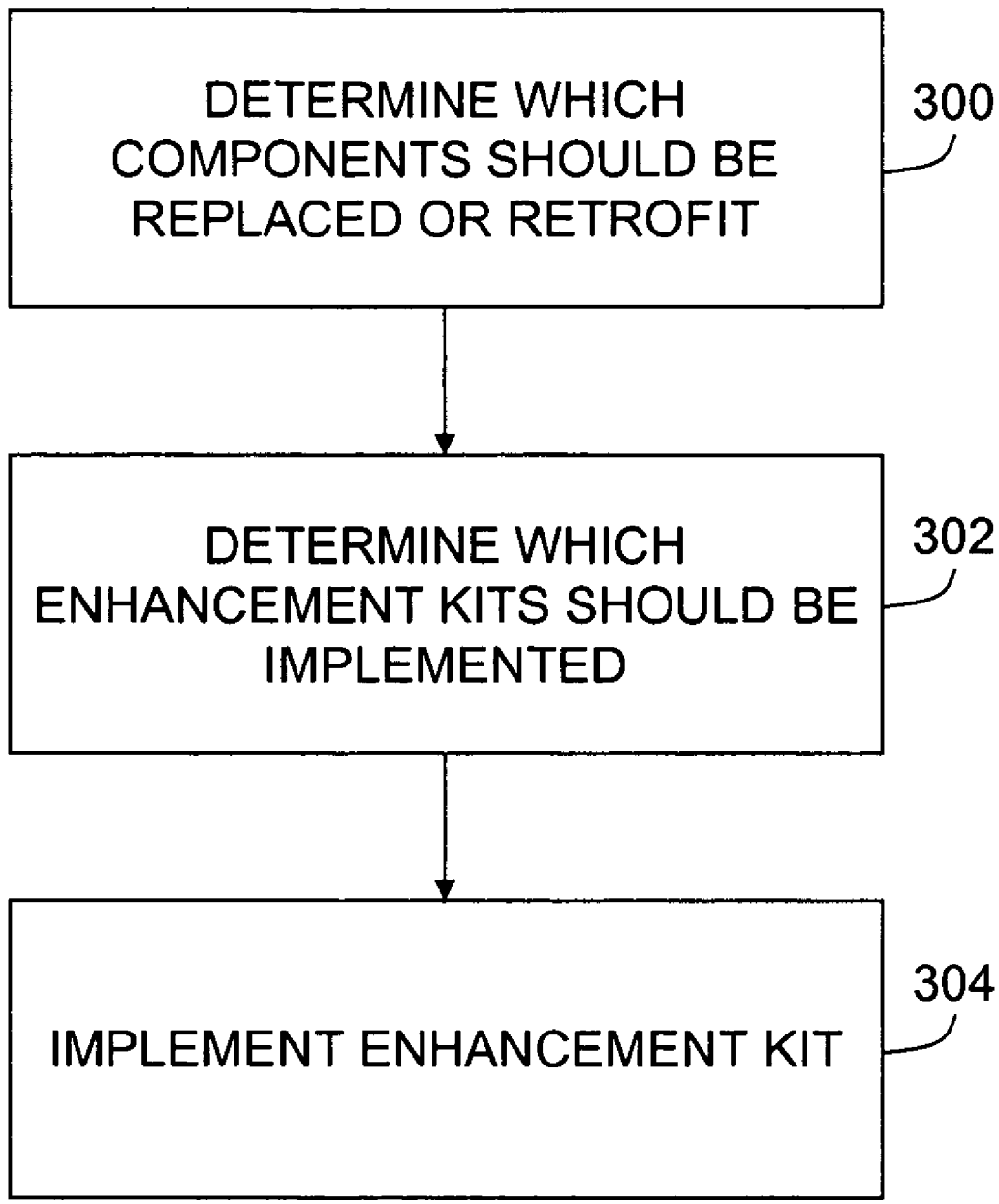
FIG. 4 is a flow chart illustrating an exemplary method used to facilitate extending a useful life of a gas turbine engine.

FIG. 4 is a flow chart illustrating an exemplary method used to facilitate extending a useful life and/or a reliability of gas turbine engine 10. When worn, deteriorated, and/or potentially damaged combustor and/or high pressure turbine components are identified as warranting replacement, such components may be removed and replaced using the methods described herein. More specifically, the replacement methods described herein facilitate extending a useful life of the gas turbine engine. For example, in one embodiment, engine overhauls can be extended from 25,000 hours to 50,000 hours using the methods described herein.

In an exemplary embodiment, only a portion of the combustor or the turbine has been identified as having been thermally stressed, worn, deteriorated, or damaged. In such circumstances, it is known to have repaired or replaced that specific section or those specific portions of the turbine or the combustor. For example, current repair methods include welding thermal fatigue cracks. Additionally, patches may be attached to areas weakened by thermal stresses. However, if the thermal stresses have induced thermal fatigue or distress in larger areas of the liners, because of the complex shapes used within the combustor or the turbine, the deteriorated portion may not have enough structural integrity to enable patches to be attached. Furthermore, depending on the severity of the distress, welding patches may lead to a loss of dimensional stability of the component. In such cases, repair of the component is not a feasible option, and instead the entire portion of the component is replaced. For example, it is known to replace a portion of a single turbine nozzle doublet or an entire combustor liner.

Using the methodology of the present invention, initially a determination 300 of which components are to be replaced or retrofitted is made. In one embodiment, the determination 300 made is based after an inspection of the engine has been completed. In another embodiment, the determination 300 is based primarily on threshold data including data relevant to, but not limited to, historical data regarding operational limits, performance parameters that trigger maintenance actions, maintenance records, or inspection limits that trigger maintenance action. In a further embodiment, the determination 300 is based primarily on threshold data received from original equipment manufacturer's (OEM) literature, including for example, notices, bulletins, technical and operational manuals, regulatory notices, or data developed in-house or by third party engineers based on preferred operational strategies.

Accordingly, in at least some embodiments, the determination 300 to replace components may be made even before the engine has been operated, before the engine has operated a pre-determined number of operating hours, or when an engine has operated the pre-determined number of operating hours. Moreover, the determination 300 may be based on a combination of a plurality of different threshold data.

Once a determination 300 has been made as to which components should be replaced or retrofitted, a second determination 302 is made regarding which enhancement kit(s) should be implemented or installed 304. Generally, each kit facilitates extending the useful life and/or the reliability of the gas turbine engine through enhanced base materials, through re-designed component design, and/or through improved cooling and/or thermal coating technology. Accordingly, as defined herein, the term enhancement kit does not include replacing a worn component with an identical component. Specifically, in the present invention, when a determination 300 has been made that at least a portion of the combustor or the turbine has been thermally stressed, worn, deteriorated, or damaged, and as such should be replaced or retrofitted, the implementation 304 of the base enhancement kit includes modifying or replacing at least a portion of the existing combustor with at least two retrofits including, but not limited to, the installation of a redesigned dome assembly, the installation of an improved swirler/fuel nozzle tip interface, and/or the installation of improved inner and outer liners.

With respect to the installation 304 of a redesigned dome assembly, within the base enhancement kit the dome assembly includes a plurality of premixer cups that have an axial length that is shorter than the axial length of known premixer cups used with known combustors. The shorter axial length facilitates reducing an overall weight of the combustor and facilitates enhanced mixing of fuel and air prior to the mixture exiting the dome. As a result, nitrogen oxide emissions generated within the combustor are reduced. Moreover, the shorter axial length facilitates preventing fuel from dwelling in the premixer cup, thus reducing a potential of fuel autoigniting within the combustor domes.

In addition, within at least some embodiments of the redesigned dome assembly, to facilitate enhanced fluid flow from the premixer cups, the retrofit premixer cups are fabricated with substantially smooth flow path surfaces, rather than the dimpled surfaces used with at least some known premixer cups. Moreover, in at least some embodiments of the redesigned dome assembly, the entire dome assembly is coated with a thermal barrier coating (TBC) to facilitate shielding the dome assembly from high temperatures generated within the combustor, and to facilitate enhanced cooling within the combustor.

With respect to the installation 304 of an improved swirler/fuel nozzle tip interface, within the base enhancement kit the retrofit swirlers have a larger diameter than the diameter of at least some swirlers used with known combustors. The increased diameter of the swirlers facilitates enhanced swirling of air supplied to the combustors, thus further enhancing the mixing of fuel and air to facilitate reducing nitrogen oxide emissions generated from the combustor. In addition, in at least some embodiments, a cowl assembly installed in conjunction with the retrofit swirler/fuel nozzle tip interface, is formed with a fuel nozzle eyelet that has a larger diameter than the diameter of fuel nozzle eyelets of at least some cowl assemblies used with known combustors. The increased diameter of the retrofit cowl assembly facilitates accommodating misalignment and/or thermal growth differentials between the fuel nozzles and the cowl assembly.

With respect to the installation 304 of improved inner and outer liners, within the base enhancement kit the retrofit outer liner is fabricated with a material that has enhanced structural and thermal qualities in comparison to outer liners used with at least some known combustors. For example, in one embodiment, within the base enhancement kit the outer liner is fabricated from HS188 material rather than HASTX® material as is used in at least some known combustors. Moreover, in at least some embodiments, the retrofit outer liner is coated with a TBC material. With respect to the inner liner, the retrofit inner liner is coated with a TBC material and is fabricated with a material having enhanced structural qualities in comparison to inner liners used with at least some known combustors. In each embodiment, the retrofit liners are formed such that neither aerodynamic performance nor combustor performance are adversely impacted by the replacement liners.

A supplemental enhancement kit proposes the installation 304 of retrofit combustor and high pressure turbine components during the same implementation 304 process. Specifically, within the supplemental enhancement kit, portions of the high pressure turbine are replaced in conjunction with portions of the combustor replaced with the base enhancement kit. Specifically, in one embodiment of the supplemental enhancement kit, at least one of the first and second stage turbine nozzles, turbine blades, shrouds, and the nozzle thermal shield, are replaced with respective retrofit nozzles, blades, shrouds, and a thermal shield fabricated from materials having enhanced durability, structural and thermal qualities. For example, in one embodiment, the retrofit nozzles are fabricated from single or mono-crystal materials, such as, but not limited to N5 commercially available from General Electric Company. In another embodiment, the retrofit nozzles include enhanced cooling schemes. In a further embodiment, the retrofit nozzles are coated with a TBC material.

During use, the enhancement kits incorporate advanced materials and coatings into existing engines, such that the frequency of engine removals attributed to combustor and/or high pressure turbine component failures, are reduced through the installation of the enhancement kits. Specifically, the kits include more durable, more temperature-resistant components that facilitate extending the useful life of the engine. Moreover, improved coatings included in at least some embodiments of the enhancement kits facilitates reducing an overall operating temperature of at least some portions of the turbine engine. In addition to the significant cost-savings in material costs over the life of the engine that are facilitated through the installation of the enhancement kits in comparison to removing and replacing entire engines, the kits also facilitate increasing the residual value of the engines and increasing engine time-on-wing. Moreover, the enhancement kits facilitate reducing an amount of nitrogen oxide emissions generated from the turbine engine.

Exemplary embodiments of combustor and high pressure turbine replacement and retrofit are described above in detail. Although the retrofit methods are herein described and illustrated in association with the above-described combustor and high pressure turbine for a gas turbine engine, it should be understood that the present invention may be used with any turbine engine configuration that includes a combustor and a turbine that is immediately downstream from the combustor. More specifically, the methods are not limited to the specific embodiments described herein, but rather, aspects of each method may be utilized independently and separately from other methods described herein.

The above-described method for retrofitting a portion of a combustor and/or a high pressure turbine for use with a gas turbine engine is cost-effective and reliable. The retrofit methods enable portions of existing combustors and turbines to be removed and replaced with retrofitted components such that a useful life of the turbine engine is facilitated to be extended. As a result, a method is provided which enables a useful life of a turbine engine to be extended in a cost-effective and reliable manner.

While the invention has been described in terms of various specific embodiments, those skilled in the art will recognize that the invention can be practiced with modification within the spirit and scope of the claims.

What is claimed is:

1. A method to facilitate extending the useful life of a turbine engine including a combustor and a turbine downstream from and in flow communication with the combustor, said method comprising:

identifying at least a portion of the combustor that is at least one of distressed, worn, deteriorated, based on pre-determined threshold data, and beyond serviceable limits;

identifying at least two enhancement kits for installation within the combustor, wherein at least one of the enhancement kits does not include the identified portion of the combustor;

removing at least two portions of the combustor including at least two portions of the group of portions consisting of: a combustor dome assembly, a swirler/cowl assembly, and a combustor inner and outer liner; and installing the at least two enhancement kits within the turbine engine such that a useful life of the turbine engine is facilitated to be increased, wherein the at least two enhancement kits are at least one of modified and retrofit versions of the at least two portions of the combustor removed wherein installing the at least two enhancement kits comprises installing at least one of a modified and retrofit version of each of the following:

a dome assembly within the combustor;
a swirler/cowl assembly within the combustor;
a inner liner and outer liner; and
the portion of the turbine comprising a turbine nozzle.

2. A method in accordance with claim 1 wherein installing the at least two enhancement kits within the turbine engine further comprises installing the retrofit dome assembly within the combustor that includes at least one premixer cup having an axial length that is shorter than an axial length of the dome assembly premixer cup removed from the combustor.

3. A method in accordance with claim 1 wherein installing the at least two enhancement kits within the turbine engine further comprises installing the retrofit dome assembly within the combustor that includes at least one premixer cup having substantially smooth and un-dimpled flow surfaces.

4. A method in accordance with claim 1 wherein installing the at least two enhancement kits within the turbine engine further comprises installing the retrofit dome assembly within the combustor that is coated with a thermal barrier coating.

5. A method in accordance with claim 1 wherein installing the at least two enhancement kits within the turbine engine further comprises installing a retrofit swirler assembly within the combustor that includes at least one swirler that has a diameter that is larger than a diameter of a swirler removed from the combustor.

6. A method in accordance with claim 1 wherein installing the at least two enhancement kits within the turbine engine further comprises installing a retrofit cowl assembly within the combustor that includes at least one nozzle eyelet that has a larger diameter than at least one nozzle eyelet removed from the combustor to facilitate accommodating at least one of misalignment and thermal growth differentials between the fuel nozzles and the retrofit cowl assembly.

7. A method in accordance with claim 1 wherein installing the at least two enhancement kits within the turbine engine further comprises installing a retrofit inner liner and outer liner within the combustor that are fabricated from a material having intrinsic material properties that are enhanced in comparison to the material used in fabricating the inner and outer liners removed from the combustor.

8. A method in accordance with claim 1 wherein installing the at least two enhancement kits within the turbine engine further comprises at least one of modifying and retrofitting at least a portion of the turbine extending downstream from the combustor when the portions of the combustor are retrofitted.

9. A method in accordance with claim 1 further comprising:

removing at least one of a turbine nozzle, a turbine blade, a turbine shroud, and a thermal shield from the turbine engine; and installing, within the turbine engine, at least one of a retrofit turbine nozzle, turbine blade, turbine shroud, and thermal shield fabricated from a material having intrinsic material properties that are enhanced in comparison to the material used in fabricating the turbine components removed from the engine.

10. A method to facilitate extending the useful life of a turbine engine, said method comprising:
determining threshold data for at least one component within at least one of a combustor within the turbine engine and a turbine within the turbine engine and downstream from the combustor;
identifying components warranting service based on the pre-determined threshold data;
removing at least a portion of the combustor and a portion of the turbine extending downstream from the combustor of the turbine engine; and
implementing an enhancement kit within the turbine engine such that a portion of the combustor and a portion of the turbine are at least one of modified and retrofit to facilitate extending a useful life of the turbine engine, and a portion of the turbine engine other than the identified components warranting service are at least one of modified and retrofit wherein implementing an enhancement kit within the turbine engine comprises installing each of the following:
a retrofit dome assembly within the combustor;
a retrofit swirler/cowl assembly within the combustor;
a retrofit inner liner and outer liner; and
a portion of the turbine extending downstream from the combustor comprising a turbine nozzle.

11. A method in accordance with claim 10 wherein removing at least a portion of the combustor and a portion of the turbine further comprises removing at least two of a combustor dome assembly, a combustor swirler/cowl assembly, and the combustor inner and outer liners from the turbine engine.

12. A method in accordance with claim 10 wherein implementing an enhancement kit within the turbine engine further comprises installing the retrofit dome assembly within the combustor that includes at least one premixer cup having an axial length that is shorter than an axial length of the dome assembly premixer cup removed from the combustor.

13. A method in accordance with claim 10 wherein implementing an enhancement kit within the turbine engine further comprises installing the retrofit dome assembly within the combustor that includes at least one premixer cup having substantially smooth flow surfaces.

14. A method in accordance with claim 10 wherein implementing an enhancement kit within the turbine engine further comprises installing the retrofit dome assembly within the combustor that is coated with a thermal barrier coating.

15. A method in accordance with claim 10 wherein implementing an enhancement kit within the turbine engine further comprises installing a retrofit swirler assembly within the combustor that includes at least one swirler that has a diameter that is larger than a diameter of a swirler removed from the combustor.

16. A method in accordance with claim 10 wherein implementing an enhancement kit within the turbine engine further comprises installing a retrofit cowl assembly within the combustor that includes at least one nozzle eyelet that has a larger diameter than at least one nozzle eyelet removed from the combustor.

17. A method in accordance with claim 10 wherein implementing an enhancement kit within the turbine engine further comprises installing the retrofit inner outer liner within the combustor that are fabricated from a material having intrinsic material properties that are enhanced in comparison to the material used in fabricating the inner and outer liners removed from the combustor.

18. A method in accordance with claim 10 wherein implementing an enhancement kit within the turbine engine further comprises installing at least one of a retrofit turbine nozzle, turbine blade, turbine shroud, and thermal shield within the turbine engine.

* * * * *